US008622799B2

(12) United States Patent
Pececnik

(10) Patent No.: US 8,622,799 B2
(45) Date of Patent: Jan. 7, 2014

(54) VIDEO GAMING SYSTEM FOR TWO PLAYERS

(75) Inventor: Joze Pececnik, Smarca (SI)

(73) Assignee: Elektroncek D.D., Menges (SI)

( * ) Notice: Subject to any disclaimer, the term of this patent is extended or adjusted under 35 U.S.C. 154(b) by 0 days.

(21) Appl. No.: 13/479,795

(22) Filed: May 24, 2012

(65) Prior Publication Data

US 2013/0316794 A1 Nov. 28, 2013

(51) Int. Cl.
*A63F 13/00* (2006.01)

(52) U.S. Cl.
USPC .................... 463/13; 463/20; 463/26; 463/27

(58) Field of Classification Search
USPC ............ 463/13, 16, 20, 25-42; 273/292, 192, 273/143 R
See application file for complete search history.

(56) References Cited

U.S. PATENT DOCUMENTS 8,192,267 B2 * 6/2012 Acres .............................. 463/13
2002/0045474 A1 * 4/2002 Singer et al. .................... 463/20
2008/0254881 A1 10/2008 Lutnick
2009/0143141 A1 6/2009 Wells
2010/0004057 A1 * 1/2010 Acres .............................. 463/26
2010/0004058 A1 * 1/2010 Acres .............................. 463/27
2010/0016050 A1 1/2010 Snow
2010/0062845 A1 3/2010 Wadds
2010/0130280 A1 5/2010 Arezina
2011/0118009 A1 5/2011 Bone
2011/0263310 A1 10/2011 Lutnick

* cited by examiner

*Primary Examiner* — Masud Ahmed
(74) *Attorney, Agent, or Firm* — Mark A. Litman & Associates, P.A.

(57) ABSTRACT

A gaming system comprising
a) two adjacent video display screen surfaces, the two adjacent video display screen surfaces sharing a common support base;
b) two separate player input controls;
c) a common processor in information communication link with each of the two separate screens and the common processor;
d) the processor configured to execute code to receive wagers from each of the two player input controls on a single common game or separate wagering game, and to execute code so that a single common game or separate wagering game is concluded;
f) the processor configured to display resolutions of each of the wagers on respective ones of the two adjacent video display screens.

19 Claims, 4 Drawing Sheets

VIDEO GAMING SYSTEM FOR TWO PLAYERS

BACKGROUND OF THE INVENTION

1. Field of the Invention

The present invention relates to the field of gaming systems, video gaming systems, processor-based video gaming systems and such video gaming systems that can be played by two or fewer on-site players at the same time or in an adjacent or an overlapping mode.

2. Background of the Art

Video gaming machines basically constitute the vast majority of slot type gaming systems within the casino industry. The original game format and the format that still predominates within the industry is the single player apparatus. A single player is positioned at the front of a machine, that single player places value at risk in the machine, a random event is displayed on the machine and the results of the random event are evaluated (now typically by a processor executing code) to determine a wagering outcome, whether a win, loss, push (tie), advancement and/or entry into an advanced round or bonus event. The fundamental nature of the machine, the process and the system is that each individual wager is resolved for a single individual player for a single random event at a single machine. Although the player may alter the size of the wager and even the underlying game by exercising options in the system program menu, the system consists of one player, one wager, one random event, one machine and one event resolution based on the outcome of the random event.

Another system is referred to as the communal gaming system. In the communal gaming system, there are multiple individual player monitors, each in a separate box, usually in banks (rows) or amphitheaters with individual seats, a common screen or separate individual screens in which a single game is played, individuals wager on their individual player terminals associated with their individual screens, while a communal game is played. Often there may be a communal screen in addition to the individual player terminal screens on which events in the game are generally displayed. A central processor receives the individual player wagering information and the communal event is resolved with respect to the individual wagers made at the individual machines.

A multiplayer format known as the Tablemaster™ gaming system is marketed by Shuffle Master Inc. This system has multiple seats (e.g., 4-6 seats) and individual player terminals on which wagering input is provided by the individual players. There is a large communal screen, usually displaying an image of a dealer, and there are individual screens at each of the multiple player positions that display images of at least playing cards received at that individual player position, and may also display images of chips, images of wager resolution (chips placed, chips added, chips removed, and any other visual information or graphics that relates to game event information or additional information (e.g., prompts, advertising, etc.). Each player position may have individual processors or boards in connection with a central gaming processor that performs the more detailed functions of game processing and image provision. Each individual player position controls its own wagering and game strategy.

Other gaming technology in which multiple screens or multiple functions for screens includes at least the following.

Published U.S. Patent Application Document No. 20090143141 (Wells) discloses various techniques for facilitating gesture-based interactions with intelligent multi-player electronic gaming systems which include a multi-user, multi-touch input display surface capable of concurrently supporting contact-based and/or non-contact-based gestures performed by one or more users at or near the input display surface. Gestures may include single touch, multi-touch, and/or near-touch gestures. Some gaming system embodiments may include automated hand tracking functionality for identifying and/or tracking the hands of users interacting with the display surface. In some gaming system embodiments, the multi-user, multi-touch input display surface may be implemented using a multi-layered display (MLD) display device which includes multiple layered display screens. Various types of MLD-related display techniques disclosed herein may be advantageously used for facilitating gesture-based user interactions with a MLD-based multi-user, multi-touch input display surface and/or for facilitating various types of activities conducted at the gaming system, including, for example, various types of game-related and/or wager-related activities. According to various embodiments, users interacting with the multi-user, multi-touch input display surface may convey game play instructions, wagering instructions, and/or other types of instructions to the gaming system by performing various types of gestures at or over the multi-user, multi-touch input display surface. In some embodiments, the gaming system may include gesture processing functionality for: detecting users' gestures, identifying the user who performed a detected gesture, recognizing the gesture, interpreting the gesture, mapping the gesture to one or more appropriate function(s), and/or initiating the function(s). In at least some embodiments, such gesture processing may take into account various external factors, conditions, and/or information which, for example, may facilitate proper and/or appropriate gesture recognition, gesture interpretation, and/or gesture-function mapping.

Published U.S. Patent Application Document No. 20100016050 (Snow) describes a system for playing a live game of chance using electronic wagering. The system uses a gaming table equipped with a card reading apparatus and multiple dual mode player/dealer displays, each with a player interface. Physical playing cards are electronically read and delivered to the casino table. Electronic information of at least one of rank and count is provided to a game processor. The game processor also sends and receives player information to and from a player display. The player display is divided into two segments, the first segment displaying player information and a second segment displaying dealer information. The player enters wagers and other play decisions through the player interface. The system displays information useful to the player on the first area and information useful to the dealer on the second segment at appropriate intervals.

Published U.S. Patent Application Document Nos. 20080254881; 20100263310; and 20110263310 (Lutnick) describe various embodiments of amusement devices and methods for various games. In some embodiments, a secondary player may engage in a game started by a first player. Various additional methods and apparatus are described. A secondary player may make odds bets or may make partial bets such as betting the third coin at a slot machine, even if the primary player has already made such bets. Primary players might see who or how many people are betting on them. In various embodiments, a primary player may be made aware of a secondary player who is participating in the game of the primary player, or who subsequently participates in the game of the primary player. The primary player may receive a name, an image, and description of various attributes (e.g., age, occupation, area of residence, etc.) of the secondary player. The primary player may also receive an indication of the performance of the secondary player while participating in the games of the primary player. For example, the primary player may see how much the secondary has won or lost, what types of bets he has made, how many games he has participated in, for how long he has been participating in the games of the primary player, and so on. A secondary player watches games in progress. The secondary player may have various ways of watching or following the game or games in which he is participating. Following a game may include receiving information about the outcome or result of the game, receiving information about symbols or indicia that have arisen in the game (e.g., cards that have been dealt), receiving information about outcomes or results received by a dealer or opposing players, receiving information about decisions that are available or have been made in a game (e.g., decisions by a primary player to hit or stand), receiving information about player mannerisms in a game (e.g., facial expressions of a primary player or his opponents), information about amounts bet on a game (e.g., amounts bet by the primary player or the secondary player), information about amounts won on a game (e.g., amounts won by the primary player or the secondary player); and so on. A split screen allows the secondary player to see all the roulette wheels in the casino at once. In various embodiments, the secondary player may follow the progress of one or more games in which he participates using one or more display screens. Display screens may include cathode ray tubes, flat panel displays, plasma displays, liquid crystal displays, diode displays, light-emitting diode displays, organic light-emitting diode displays, projection displays, rear projection displays, front projection displays, digital light processing (DLP) displays, surface-conduction electron-emitter (SED) displays, electronic ink displays (e.g., E-Ink Corp's display technology), holographic displays, and so on.

Published U.S. Patent Application Document No. 20110118009 Bone describes a wagering game system and its operations. In some embodiments, the operations can include initiating, at a gaming machine, an analysis mode of a wagering game training tool associated with a wagering game, and determining when a player has played a predefined number of rounds of the wagering game. The operations can also include determining a skill level associated with the player for one or more areas of skill associated with the wagering game based, at least in part, on the predefined number of rounds played by the player. The operations can further include identifying an area of skill associated with the wagering game where the skill level associated with the player is less than a predefined skill level, and initiating a training mode of the wagering game training tool to improve the skill level associated with the player in the identified area of skill. The online wagering game server may customize a training mode based on the one or more variables in the state of play to improve the player's performance at the casino floor. In one implementation, the wagering game training tool implemented by the training tool manager customizes a training mode based on the one or more variables in the state of play.

Published U.S. Patent Application Document No. 20100130280 (Arezina) discloses a multi-player gaming system sensing multiple simultaneous contacts on a surface of a gaming table, differentiating contacts by different players. Privacy controls selectively display private information visible to only one of the players on or near the display surface of the gaming table. The gaming system also detects physical objects placed on the surface of the gaming table, causing wagering game functions or peripheral functions to be performed as a result of the placement of the object on the display surface. In some embodiments, a split screen may be implemented to convey private information to players, perhaps by using a lenticular lens that creates a convex perspective of multiple images or light sources. The simplest form of a lenticular lens is a bifocal, which has just two magnifying lenses. Using a three-part lenticular lens, a viewing screen could be split into three portions: all three could be showing the identical image during some portion of the game play, and then, during another part of the game, the screens might be split to show a first player his cards on the first screen portion, a second player his cards on the second screen portion, and a third (e.g., middle) screen portion with both hands down. Multiple video images may thus be viewed from different angles, so that game play elements can be added. A composite image of all of desired views may be displayed, with the various parts of the lenticular lens used to separate them for multiple players, each viewing from a different angle.

Published U.S. Patent Application Document No. 20100062845 (Wadds) describes a system for playing a live game of chance using electronic wagering and enabling player-initiated change of denomination of virtual chips. The system uses a gaming table equipped with a card reading apparatus and multiple dual mode player/dealer displays, each with a player interface. Physical playing cards are electronically read and delivered to the casino table. Electronic information of at least one of rank and count is provided to a game processor. The game processor also sends and receives player information to and from a player display. The player display is divided into two segments, the first segment displaying player information and a second segment displaying dealer information. The player enters wagers and other play decisions through the player interface. The system displays information useful to the player on the first area and information useful to the dealer on the second segment at appropriate intervals. FIG. 3 shows an embodiment of a "How to Play" player-game information screen design, wherein a player views game information in the player screen area by pressing the "help" button in the first player area. In this mode, it should be noted that the split screen line remains displayed, and the dealer screen area is displaying the game title/logo in a text and manner readable by the player.

The above references, and all materials cited herein are incorporated by reference in their entirety to provide technical enablement of systems, components, electronics and methods.

SUMMARY OF THE INVENTION

1. A gaming system comprising a) two adjacent video display screen surfaces, the two adjacent video display screen surfaces sharing a common support base and a common angle with respect to vertical orientation;

b) two separate player input controls, preferably that are physically attached to each other and to no other player input controls or terminals;

c) a common processor in information communication link with each of the two separate screens and the common processor;

d) the processor configured to execute code to receive wagers from each of the two player input controls on a single common game or separate wagering game, and to execute code so that a single common game or separate wagering game that is performed is concluded;

e) the processor configured to resolve each of the wagers received from each of the player input controls on the common game or the separate game, and f) the processor configured to display resolutions of each of the wagers received from each of the player input controls on the common game or the separate game on respective ones of the two adjacent video display screens.

DETAILED DESCRIPTION OF THE INVENTION

Figure 1:
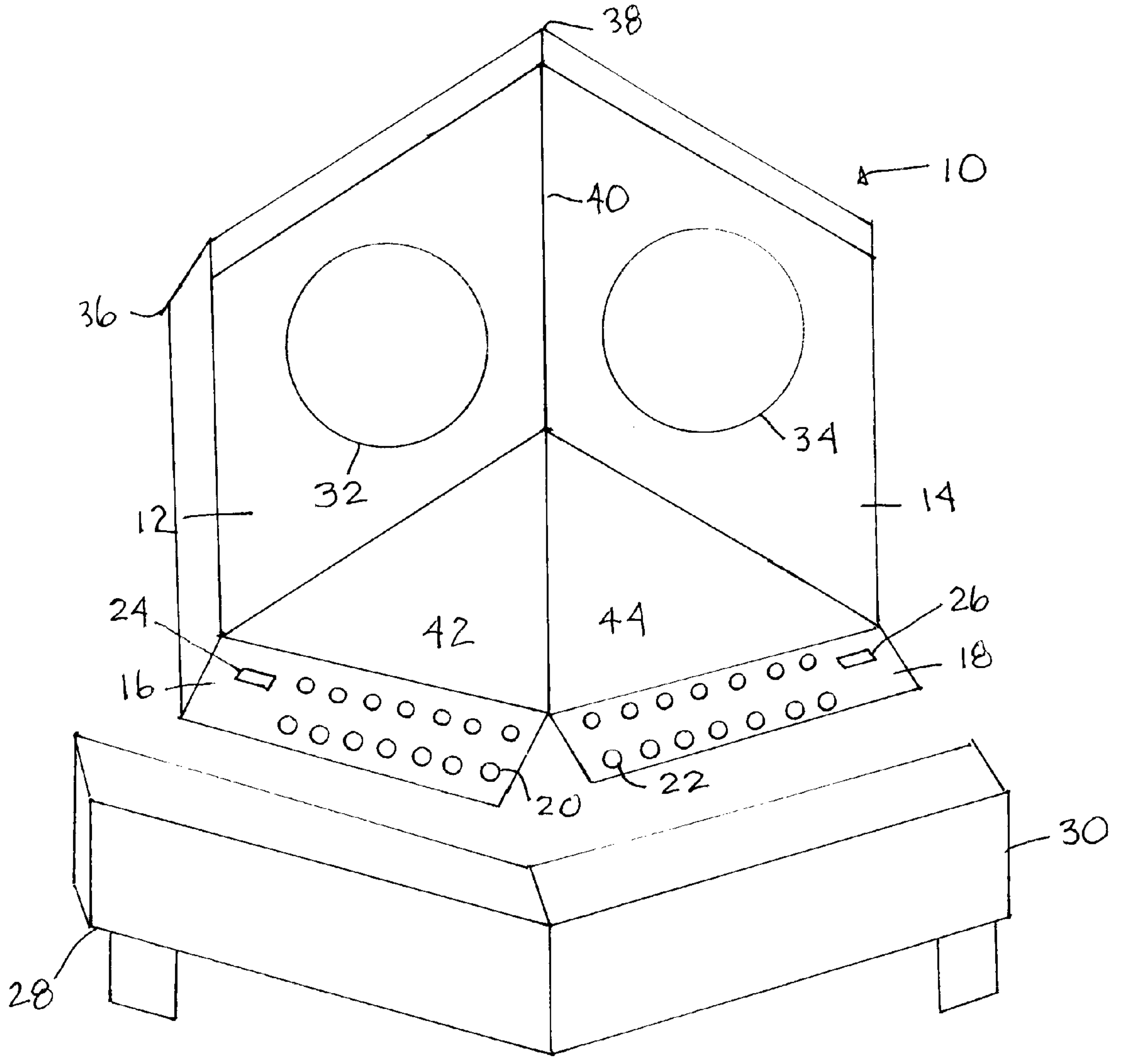
FIG. 1 shows one structural system for enabling a system of the present invention with an acute angled screen and dedicated dual seating.

The present technology describes methods, systems and apparatus for enabling and performing video wagering games. A general description of the technology may include a gaming system having:

a) two adjacent video display screen surfaces, the two adjacent video display screen surfaces sharing a common support base and a common angle with respect to vertical orientation. The "two" display screens may be a single continuous screen with separate areas thereon which are dedicated during play of the game to separate ones of two separate player input controls; or two contiguous screens which are dedicated during play of the game to separate ones of two separate player input controls; or two proximate and separate screens which are dedicated during play of the game to separate ones of two separate player input controls.

b) two separate player input controls. The player input controls may be a typical panel entry system with buttons, keyboard, mouse, or separate touchscreen entry area. The video display screen surfaces themselves may enable touchscreen player input area. The two player input controls may be, for example, on attached terminals, and even attached terminals with a communal screen, in an amphitheater setting. In this manner, individual may play at a machine or multiple players may play at separate machines against only the associated player at the two terminal or two screen device.

c) a common processor is in information communication link with each of the two separate screens and the common processor. The processor may be a single processor or multiple processors. The processor(s) may contain game content, random number generation functionality, video content to be transmitted to displays, encryption and security functions, accounting functions, signal receipt and interpretation functions, comparative functions, audio functions, credit/currency/value recognition functions, and other game operation, game control and game ancillary functions. The processor may have game content, audio content, video content, accounting content, look-up tables and ancillary content necessary o desirable in memory for enabling execution of code and providing code to effect game play. The games may include any card games (e.g., blackjack, baccarat, all poker games and variations thereof, by way of non-limiting examples, Three-Card Poker™ games, Four-Card Poker™ games, Crazy-4-Poker™ games, Five Card stud, Five Card draw, Six Card poker games, seven card stud, Hi-Lo poker, etc.,), dice games (e.g., Craps, Sic Bo, movement games that are dice controlled, etc.), slot symbol games (e.g., 3×3 symbol games, 3×5 symbol games, Triple Diamond™ game, Wheel of Fortune™ game, Monopoly™ video game, video poker, bonus poker games, triple poker games, multi-line poker games and the like), virtual spinning wheel games (e.g., roulette, Big Six™ games, candy wheels, etc.), and any other gaming format that can be enabled in virtual format and upon which wagers can be placed.

This type of game or method or system may include a gaming system with a) a communal video display screen surfaces, the communal video display screen displaying a communal, game, b) two adjacent video display screen surfaces comprising a first video display surface and a second video display surface sharing a common support base and a common angle with respect to vertical orientation;

c) two separate player input controls, comprising a first player input control input-associated with the first video display surface and a second player input control input-associated with the second video display surface;

d) a common processor in information communication link with each of the two separate screens and the common processor;

e) the processor configured to execute code to receive wagers from each of the two player input controls on a single common game displayed on the communal video display screen, and to execute code so that a the single common game is performed is concluded;

f) the processor configured to resolve each of the wagers received from each of the player input controls on the single common game, and g) the processor configured to display resolutions of each of the wagers received from each of the player input controls on the common game or the separate game on respective ones of the two adjacent video display screens;

wherein the first video display surface reports resolved wagers or credits from both the first player input control and the second player input control, and the second video display surface reports resolved wagers or credits from both the first player input control and the second player input control.

d) the processor is configured to execute code to receive wagers from each of the two player input controls on a single common game or separate wagering game, and to execute code so that the performed a single common game or separate wagering game are concluded;

e) the processor is configured to resolve each of the wagers received from each of the player input controls on the common game or the separate game. The game resolution shall usually execution of code to employ and assess game rules, determination of wards based on a look-up table association information on wager size and wager type against the look-up table or code effecting resolution of wagers.

f) the processor is configured to display resolutions of each of the wagers received from each of the player input controls on the common game or the separate game on respective ones of the two adjacent video display screens.

The system may have the two adjacent video display screen surfaces as a single display screen having two distinct areas having a first player input controlled area and a second player input controlled area, each displaying a common gaming event (e.g., roulette, craps, poker, video slot event, etc.) and allowing individual and distinct wagers by the two players. The system may have the two adjacent video display screen surfaces that may each be separate display screens, a first display screen having a first player input controlled area and a second display screen having a second player input controlled area, each display screen showing a common game and allowing a single player to enter wagers on the common game. The system may have a non-image providing frame that separates the first display screen from the second display screen. The system may have a display face of the first display screen and a display face of the second screen that do not lie within a common plane. The term "not within a common plane" means that there is no single plane shared by the two faces. They may be offset or the faces preferably angled with respect to each other so that a distinct angle is formed between the individual angles of the faces of the display screens. The screens may or may not share an edge, may or may not be vertical with respect to a single plane (e.g., the floor or support), the faces may share a sloped horizontal edge so that the faces may also be skewed as well as not within a common plane. The display faces of the first display screen and the second display screen may form an acute angle or form an obtuse angle.

The system may be configured so that a first player input is capable of providing signals to the processor that affect image displayed on the first player input controlled area and a second player input is capable of providing signals to the processor that affect image displayed on the second player input controlled area.

The system may have seating for two players is positioned and dedicated to the system and a back support of one seat is positioned within 15 degrees of parallel to the first display screen and a back support of a second seat is positioned within 15 degrees of parallel to the second display screen.

The processor may execute code to accept wagers from only the two player input controls on a single processor executed wagering game. The processor may execute code to accept wagers from only the two player input controls on a separate processor-executed wagering game which is capable of being played contemporaneously by the processor. The processor may execute code to compare degree of performance at the first player input control and the second player input control and transmits image data to the two separate screens.

There is no primary player or secondary player, although the system may accommodate play with a single player when no partner is available. The two players may derive a measure of satisfaction or gratification from the participation of the second player in a companionship mode or friendly competitive mode. For example, a first player (without being a primary player) will be able to visually (or by the processor executing code to compare and visually display) a comparison between first and second players on the basis of, for example, a) absolute amounts won, b) percentage change from original credits obtained, c) percentage achievement of perfect play, or d) relative comparison with the other player.

The two players may also access credit from a single credit pool or account and shift credits between machines to initiate, continue or restart a competition. The processor can execute code that operates a single credit pool, multiple (especially two) subsets of credits for the two individual players and shifting credits between two subsets and from the credit pool. The transfer may require single player approval or dual player approval.

A split screen allows the secondary player to see all the play, results and selections of the paired player at once. In various embodiments, the secondary player may follow the progress of one or more games in which he participates while watching play of the paired player. Display screens may include cathode ray tubes, flat panel displays, plasma displays, liquid crystal displays, diode displays, light-emitting diode displays, organic light-emitting diode displays, projection displays, rear projection displays, front projection displays, digital light processing (DLP) displays, surface-conduction electron-emitter (SED) displays, electronic ink displays (e.g., E-Ink Corp's display technology), holographic displays, and so on. A single screen may contain information about a single game in which the secondary player participates. The display screen may display information about one game on one part of the screen, and about another game played by another player on another part of the screen.

FIG. 1 shows one structural system 10 for enabling a system of the present invention with an acute angled, two section screen 12 14 screen and dedicated dual seating 28 30. The system is shown with the left top edge 36 of the left panel section 12 of the screen forward of the top center portion 38 where left screen 12 and right screen 14 abut. There may be a seemless, sections, framed, bar-separated, even physically spaced apart dividing line 40 between the left screen 12 and the right screen 24 in the system 10. With the acute angle between the screens 12 and 14, the right player seating 30 may be ergonomically angled towards the left screen 12 and the images 32 thereon, with left screen control panel 18 on the right side of the system 10, again ergonomically oriented towards the left screen 12 which displays game event activity to the right side player. Similarly, the right screen 14 control panel 16 is ergonomically oriented on the left side of the system 10 to face the right screen 14 and the images 34 displayed on the right screen 14. The respective control panels 16 18 are shown with buttons 20 22, respectively and currency/card/ticket entry systems 24 26, respectively. The panels 16 18 may alternatively be a touchscreen data entry system, keyboard, mouse, etc. The areas 42 44 may be dead space or may contain other features such as another screen to view gaming data, view a common game element, watch separate sports events, play music, or provide other entertainment features separate from or related to the actual underlying game being played. Where the game is roulette that is being played by the left-hand and the right-hand player, the panels 12 14 may respectively show individual results for the player with the same (identical) roulette spin event (that is, the resulting numbers for the left-hand player and the right-hand player are the same for every spin) or there may be independent spin events (each screen shows a separate independent roulette spin event) that is done relatively simultaneously. That is a virtual roulette wheel spin on screen 12 in display area 32 may begin for the right-hand player at bench spot 30 at approximately the same time as the virtual roulette spin on screen display area 34 for the left-hand seated player on bench spot 28. It is possible for the displayed roulette wheel (or other game) event to be a physical event that is video displayed from real life events or digitally synthesized from real life events to be displayed on the screen area 32 34, as with communal type games (e.g., Rapid Roulette™ gaming system), but the two individual seating areas and displays would still be connected and could still share a common credit system and have accounts linked. The use of the dual player system 10 in a community or common underlying game would likely slow down some individual play, even if time limits on placing the wagers were imposed. Therefore keeping individual game plays for dual user systems again provides a more contained system and a more intimate environment for the two players.

Figure 2:
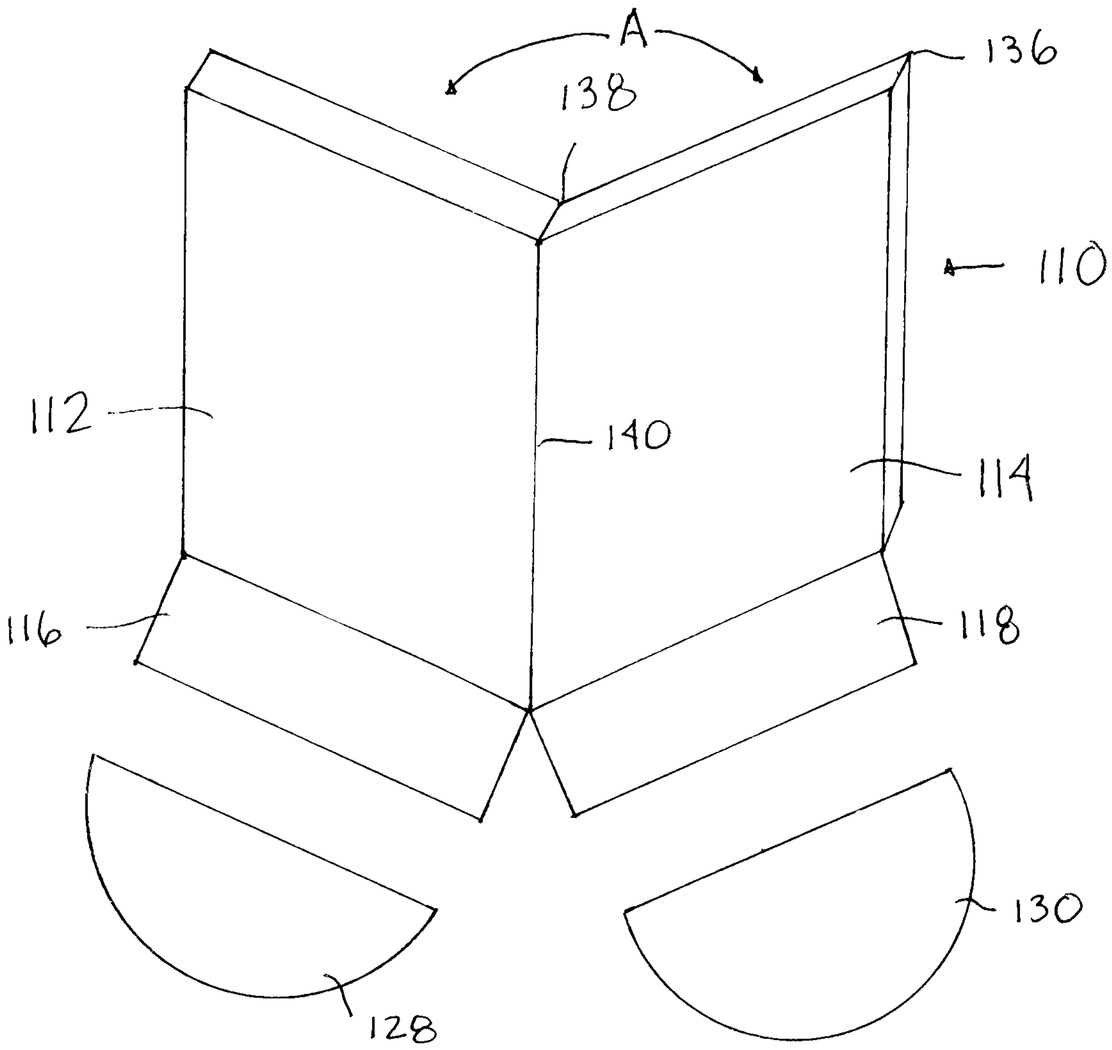
FIG. 2 shows one structural system format for enabling a system of the present invention with an obtuse angled twin-screen system.

FIG. 2 shows one structural system 110 format for enabling a system of the present invention with an obtuse, forward-angled twin-screen 112 114 system. The top edge 138 which helps define the meeting line 140 of the two screens 112 114 is forward towards the two separate players' seating 128 130 so that an obtuse angle is formed towards the player positions. The angle A between the left-hand screen 112 and the right-hand screen 114 now allows for the left-side control panel 116 to operate the left-side screen 112 and for the right-side control panel 118 to control the right-side screen 114. The reverse side acute angle A complementing the forward obtuse angle of the screens should not be so severe as to block view of the opposed player's screens. This would usually mean that the acute angle A should be no less than about 135° and the obtuse angle for the front side should be no more than 225°. There is a little more tolerance and leeway in the angles with the acute screen of FIG. 1. Individual seating 128 130 is shown as wholly separate seats 128 130 in FIG. 2 as opposed to the bench seating 28 30 of FIG. 1.

Figure 3:
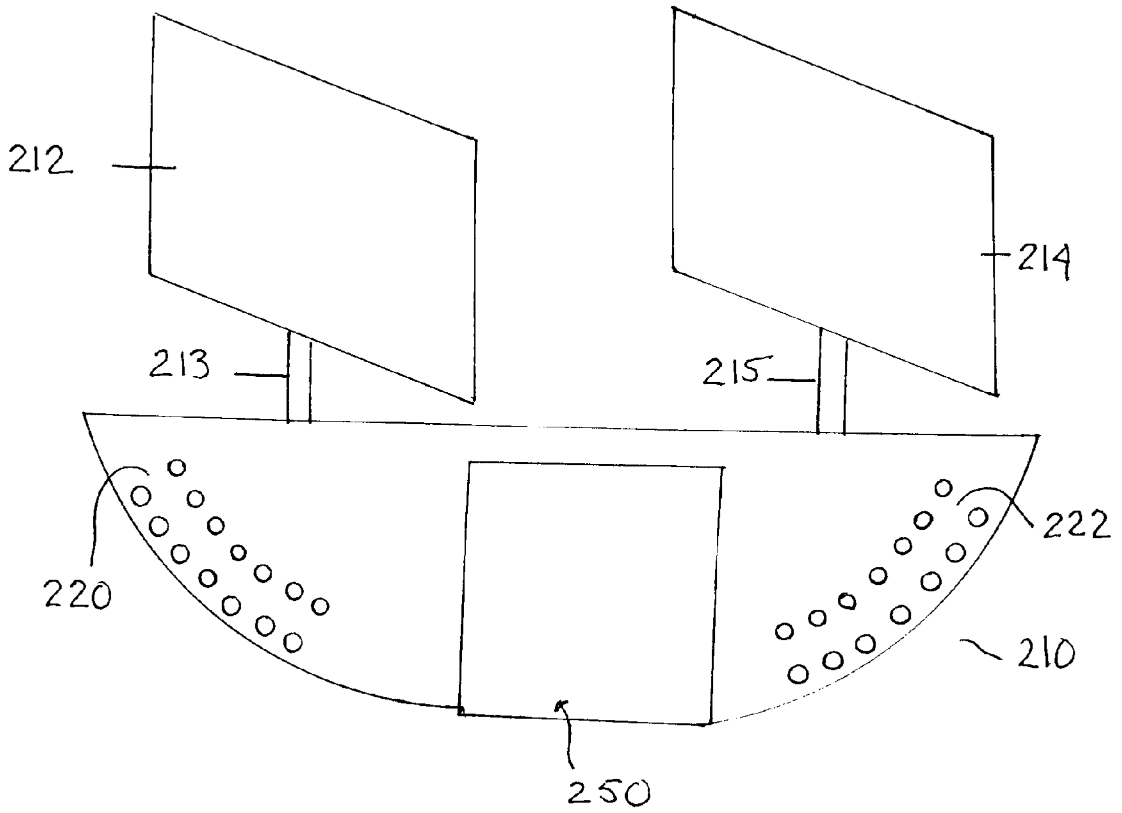
FIG. 3 shows one structural system format for enabling a system of the present invention with a swiveled, variable angle twin-screen system.

FIG. 3 shows a structural system 210 for providing dual screen 212 214 on a swivel format at a single gaming system 210 structure. The screen 212 214 are respectively shown on swiveling posts 213 215 so that viewing by respective players at the control panels with player input controls 220 222 can be adjusted for view. The screens 212 214 may be swiveled to remove view from the other player if desired, or swiveled to allow view by the other player. A common screen 250 may be used to allow common game results to be simultaneously viewed by the two players or to allow help access and other game features.

Figure 4:
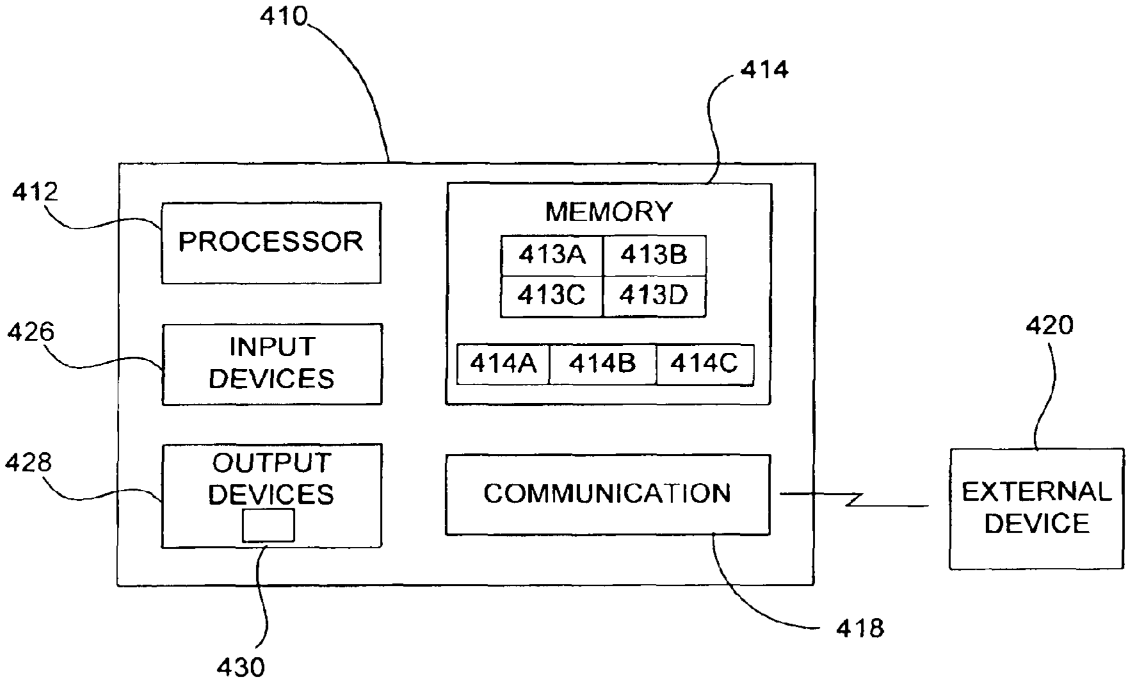
FIG. 4 is a block diagram of a gaming device 410, in accordance with one embodiment of the present invention.

A Block diagram is shown in FIG. 4 is a block diagram of a gaming device 410, in accordance with one embodiment of the present invention. As used herein, gaming device 410 refers to any single screen, two-player input devices associated with game play including for example receiving credit, inputting data into a game, processing the results of the game, outputting both the game and the results of the game, recording the results of the game, monitoring the game, paying out the game, and the like. The gaming device 410 may for example be the two-player gaming machine as described above. The gaming device 410 typically includes a processor or controller 412 that carries out operations associated with the gaming device 410. The processor 412 operates to executes code and produce and use data. The code and data 413 may for example include log files 413A, operating systems 413B, communication code 413C, gaming code and data 413D, and the like.

The code and data 413 may reside within memory block 414 that is operatively coupled to the processor 412. The memory block 414 generally provides a place to hold data and code that is being used by the gaming device 410. The memory block 414 may include one or more memory components including non-volatile memory components 414A such as ROM or flash memory, volatile memory components 414B such as RAM (in any of its various forms), and/or a hard drive 414C. The memory block 414 may also include removable media 414D such as CDs, DVDs, floppy's, magnetic tape, etc. The memory block 414 may also include memory components located over a network.

The gaming code or data 413D may include the gaming logic (all the logic for determining financials, whether a win or loss, amount of win, random numbers, etc.). The gaming data or code 413D may also include gaming state or history. The gaming data or code 413D may also include non-gaming logic such as code for performing outputs and receiving inputs associated with the game being played (e.g., the code used to display the game and the results of the game).

All or a portion of the gaming code and data 413D may be stored in one or more of these memory components 414A-D. For example, the gaming code and data 413D may be stored entirely in one memory component such as hard drive 414C, RAM 414B or flash memory 414A. Alternatively, the gaming code and data 413 may be spread across multiple memory components 414. For example, a first portion may be stored in a first memory component, and a second portion may be stored in a second memory component. Additionally, a third portion may be stored in a third memory component and so on. In one particular embodiment, the gaming code and data 413 is stored on the hard drive 414C. In fact, the hard drive 414C may be partitioned into multiple partitions where the operating system 413B resides on one partition, the gaming data and code 413D including for example executable files, binaries and resources, reside on another partition, a third partition serves as a place for writing log entries 413A, and a fourth partition contains communication code 413C designed to maintain contact with external systems such as peripherals, hosts, servers, etc. In another particular embodiment, the gaming code and data 413 is stored in RAM 414B. For example, the hard drive 414C may contain the operating system 413B, log files 413A and communication code 413C, and the gaming data and code 413D may be downloaded from a server system at run time and stored in volatile memory. In yet another particular embodiment, various portions of gaming code and data 413D is stored in both the hard drive 414C and RAM 414B. For example, a first portion of the gaming code and data 413D may be stored in the hard drive 414C, and a second portion of the gaming code and data 413D may be stored in RAM 414B. The gaming device 410 also includes a communication interface 418 from each of the two player input controls that is operatively coupled to the processor 412. The communication interface 418 provides a means to communicate with a external devices 420 such as server systems, peripherals, hosts, and/or the like via a data link 422 provided over a wired or wireless connection. The communication interface 418 may for example utilize the communication code 413C stored in memory 4314. In the case of a wireless connection, the communication interface 418 may include a transceiver and an antenna. Also, the communication interface 420 can use various wireless communication protocols including for example IEEE 802.11a, IEEE 802.11b, IEEE 802.11x, hyperlan/2, Bluetooth, HomeRF, etc.

The gaming device 410 also includes the two player input devices 426 that are operatively coupled to the processor 412. The input devices 426 allow a user to interact with the gaming device 410. For example, they allow a user to input data into the gaming device 410. The input devices 426 may take a variety of forms including for example buttons, switches, wheels, dials, keys, keypads, navigation pads, joysticks, levers, touch screens, touch pads, microphone, mouse, trackball, bill receptors, etc.

The gaming device 410 also includes one or more output devices 428 that are operatively coupled to the processor 412. The output devices 428 allow the gaming device 410 to interact with the users. For example, they allow the gaming device to output data associated with the game to the user. The output devices 428 may take a variety of forms including for example a display, speakers (or headset), indicator lights, display lights, printers, physical reels, etc.

In one embodiment, the gaming device 410 typically includes the common game display 430 such as a CRT display or LCD display for displaying a graphical user interface GUI. The GUI provides an easy to use interface between a user of the gaming device and the operating system or applications (e.g., games) running thereon. Generally speaking, the GUI represents, programs, files and various selectable options with graphical images. The GUI can additionally or alternatively display information, such as non interactive text and graphics, for the user of the gaming device. In the case of a gaming machine or game player, the GUI may include the various features of the game being played thereon. Alternatively or additionally, the gaming device may include a physically reel slot.

The configuration of input and output devices 426 and 428 may vary according to the type of gaming device 410, and if a gaming machine or game player, the game or games being played thereon. Each game may have a set of dedicated inputs and outputs or multiple games may utilize the same inputs and outputs.

What is claimed:

1. A gaming system comprising:

a) two adjacent video display screen surfaces, the two adjacent video display screen surfaces sharing a common support base and a common angle with respect to vertical orientation: and a relative obtuse or acute angle with respect to the two display screen surfaces;

b) two separate player input controls at two adjacent seating areas in front of the two adjacent video display screen surfaces;

c) a common processor in information communication link with each of the two separate screens and the common processor;

d) the processor configured to execute code to receive wagers from each of the two player input controls on a single common game or separate wagering game, and to execute code so that a single common game or separate wagering game that is performed is concluded;

e) the processor configured to resolve each of the wagers received from each of the player input controls on the common game or the separate game, and f) the processor configured to display resolutions of each of the wagers received from each of the player input controls on the common game or the separate game on respective ones of the two adjacent video display screens; wherein the two adjacent video display screen surfaces comprise two distinct and separate screens having two distinct areas comprising a first player input controlled area and a second player input controlled area, and the relative orientation between the two distinct and separate screens is selected from the group consisting of the two screens being separated by an obtuse angle, the two screens being separated by an acute angle and each of the two screens being independently rotatable.

2. The system of claim 1 wherein the two adjacent video display screen surfaces comprise two separate display screens, a first display screen having a first player input controlled area and a second display screen having a second player input controlled area, and the two separate display screens being separate by either an obtuse angle or an acute angle.

3. The system of claim 2 wherein a non-image providing frame separates the first display screen from the second display screen.

4. The system of claim 2 wherein a display face of the first display screen and a display face of the second screen do not lie within a common plane.

5. The system of claim 4 wherein the display faces of the first display screen and the second display screen form an acute angle.

6. The system of claim 4 wherein the display faces of the first display screen and the second display screen form an obtuse angle.

7. The system of claim 1, wherein a first player input is capable of providing signals to the processor that affect image displayed on the first player input controlled area and a second player input is capable of providing signals to the processor that affect image displayed on the second player input controlled area.

8. The system of claim 2 wherein a first player input is capable of providing signals to the processor that affect image displayed on the first player input controlled area and a second player input is capable of providing signals to the processor that affect image displayed on the second player input controlled area.

9. The system of claim 4 wherein a first player input is capable of providing signals to the processor that affect image displayed on the first player input controlled area and a second player input is capable of providing signals to the processor that affect image displayed on the second player input controlled area.

10. The system of claim 4 wherein seating for two players is positioned and dedicated to the system and a back support of one seat is positioned within 15 degrees of parallel to the first display screen and a back support of a second seat is positioned within 15 degrees of parallel to the second display screen, and each display screen may be independently swiveled.

11. The system of claim 5 wherein seating for two players is positioned and dedicated to the system and a back support of one seat is positioned within 15 degrees of parallel to the first display screen and a back support of a second seat is positioned within 15 degrees of parallel to the second display screen, and each display screen may be independently swiveled.

12. The system of claim 6 wherein seating for two players is positioned and dedicated to the system and a back support of one seat is positioned within 15 degrees of parallel to the first display screen and a back support of a second seat is positioned within 15 degrees of parallel to the second display screen, and each display screen may be independently swiveled.

13. The system of claim 1, wherein the processor executes code to accept wagers from only the two player input controls on a single processor executed wagering game.

14. The system of claim 4 wherein the processor executes code to accept wagers from only the two player input controls on a single processor executed wagering game.

15. The system of claim 1, wherein the processor executes code to accept wagers from only the two player input controls on a separate processor executed wagering games which are capable of being played contemporaneously by the processor.

16. The system of claim 4 wherein the processor executes code to accept wagers from only the two player input controls on a separate processor executed wagering games which are capable of being played contemporaneously by the processor.

17. The system of claim 14 wherein the processor executes code to compare degree of performance at the first player input control and the second player input control and transmits image data to the two separate screens.

18. The system of claim 16 wherein the processor executes code to compare degree of performance at the first player input control and the second player input control and transmits image data to the two separate screens.

19. A gaming system comprising:

a) a communal video display screen surfaces, the communal video display screen displaying a communal game, and a relative obtuse or acute angle between the two display screen surfaces;

b) two adjacent video display screen surfaces comprising a first video display surface and a second video display surface sharing a common support base and a common angle with respect to vertical orientation, at two adjacent seating areas in front of the two adjacent video display screen surfaces;

c) two separate player input controls, comprising a first player input control input-associated with the fi video display surface and a second player input control input-associated with the second video display surface;

d) a common processor in information communication link with each of the two separate screens and the common processor;

e) the processor configured to execute code to receive wagers from each of the two player input control on a single common game displayed on the communal video display screen, and to execute code so that the single common game is performed and is concluded;

f) the processor configured to resolve each of the wagers received from each of the player input controls on the single common game, and g) the processor configured to display resolutions of each of the wagers received cd from each or the player input controls on the common game or the separate game on respective ones of the two adjacent video display screens:

wherein the first video display surface reports resolved wagers or credits from both the first player input control and the second player input control, and the second video display surface reports resolved wagers or credits from both the first player input control and the second player input control; and the two adjacent video display screen surfaces comprise two distinct and separate screens having two distinct areas comprising a first player input controlled area and a second player input controlled area, and the relative orientation between the two distinct and separate screens is selected from the group consisting of the two screens being separated by an obtuse angle, the two screens being separated by an acute angle and each of the two screens being independently rotatable.

* * * * *